W. E. YATES.
HORSESHOES.

No. 184,001.      Patented Oct. 31, 1876.

WITNESSES:
E. A. Nottingham
J. L. Skidmore

Walter E. Yates
by his Attorney
Howson and Son

UNITED STATES PATENT OFFICE.

WALTER E. YATES, OF MANCHESTER, ENGLAND.

IMPROVEMENT IN HORSESHOES.

Specification forming part of Letters Patent No. 184,001, dated October 31, 1876; application filed November 19, 1875.

*To all whom it may concern:*

Be it known that I, WALTER EDWARD YATES, of Manchester, England, have invented certain improvements in shoes employed to protect the feet or hoofs of horses, asses, and other animals, of which the following is a specification:

The invention, for which I obtained Letters Patent of the Kingdom of Great Britain, No. 2,509 of 1874, relates to the shoes which are attached to the hoofs of horses, ponies, asses, and other draft animals, and animals employed in the conveyance of burdens. Previously to this invention such shoes have been made of iron, and have been more or less rigid, and the jar when the shoe has struck the ground has had an injurious effect upon the hoof and adjacent parts; and such shoes have been liable to slip upon asphalt and other pavements. According to this invention the shoes are made wholly or partially of untanned animal hide, such, for example, as the well-known "buffalo hide."

Figure 1:
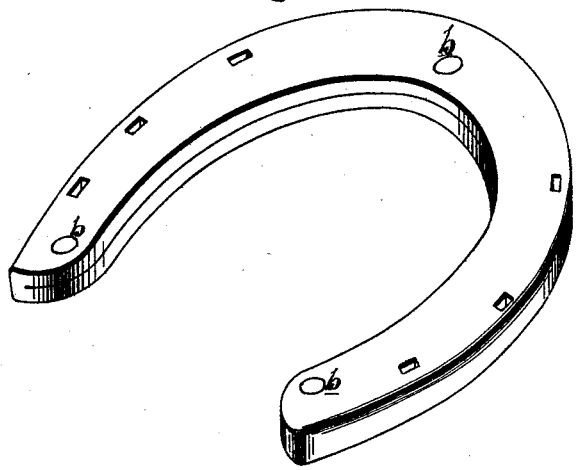
Figure 2:
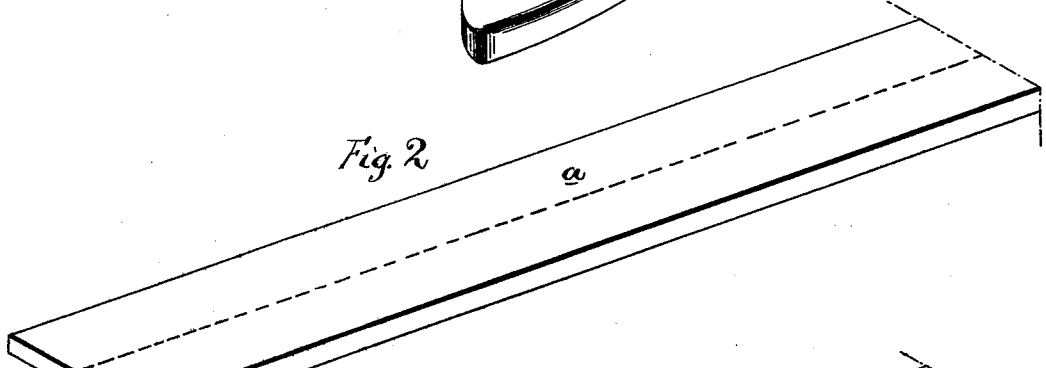

In the accompanying drawing, Figure 1 is a perspective view of my improved horseshoe; Fig. 2, a perspective view of one of the strips of hide before being folded, and Fig. 3 a view of a folded strip before being pressed into form.

Figure 3:
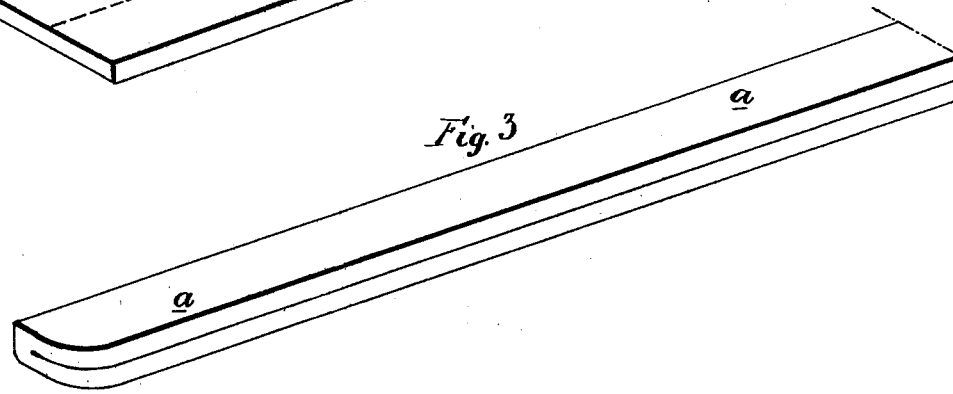

The shoes are formed by cutting the hide into strips, a, Fig. 2, each of which is folded, as shown in Fig. 3, so as to double the thickness, and bent into the horseshoe form, the fold being outward and the cut edges inward. (See Fig. 1.) Additional strips may be interposed to increase the thickness, if required. The folds are secured together by stitching, riveting, clamping, or cementing. Copper rivets, staples, or clamps b, inserted and secured in a similar manner as when making leather strapping, may be used for the purpose, the line of rivets being somewhat near the inner cut edges of the hide. The shoe so formed may be submitted to compression within or between dies formed to impart the desired shape and size to the shoes, and to produce a better finish.

If the shoes are required to withstand the action of moisture, they are now to be subjected to a waterproofing process, or the said process may precede the compression with dies.

Litharge is added to linseed-oil in the proportion of about three and a half ounces to each gallon of oil, and the mixture is boiled gently for about two hours. The supernatant oil is then freed from the sediment, and is heated to about 100° Fahrenheit. The shoes are placed in the oil and kept therein for several days, or, say, about a week. They are then removed and kept in a stove or chamber heated to about 120° Fahrenheit for several days, or until quite dry, with a free admission of air to the stove or chamber. The shoes are then ready for use.

It is preferable to hasten the penetration of the oil by employing fluid pressure. The shoes and the oil, treated as aforesaid, are to be placed in a suitably-strong vessel, in which a vacuum is formed in order to withdraw the air from the interstices of the hide. A considerable amount of fluid pressure must then be obtained within the vessel by pumping in a further supply of the treated oil, or by other suitable means. The vacuum followed by the fluid pressure may be repeatedly applied in alternation, or the pressure may be maintained until the shoes are permeated with the oil. The hide may be so treated before being formed into shoes, but this may not be so suitable or convenient.

It will be evident, however, that any of the ordinary waterproofing processes may be employed instead of the one above described, as such process does not form part of the present application.

I am aware that horseshoes have been heretofore made of rubber, and also of leather; but the rubber shoes are found to be objectionable, since they heat or "draw," as it is termed, and consequently make the feet of the animal tender. When leather shoes are used, the acids, tannin, &c., resulting from the process of tanning are absorbed into the hoof and cause disease. By making the shoe wholly of rawhide both of these objections are removed.

I claim as my invention—

1. As a new article of manufacture, a horseshoe constructed wholly of rawhide, with the exception of the rivets, as set forth.

2. As a new article of manufacture, a horseshoe made of rawhide rendered water-proof.

3. The within-described process of forming horseshoes—that is to say, doubling a strip of hide, bending it into shape, and riveting the doubled strip, substantially in the manner described.

WALTER EDWD. YATES.

Witnesses:
 EDWARD K. DUTTON,
 HUGH G. GRANT.